US008983773B2

(12) United States Patent
Hamilton, II et al.

(10) Patent No.: US 8,983,773 B2
(45) Date of Patent: *Mar. 17, 2015

(54) PICTORIAL NAVIGATION

(75) Inventors: Rick A. Hamilton, II, Charlottesville, VA (US); Neil A. Katz, Parkland, FL (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/611,465

(22) Filed: Sep. 12, 2012

(65) Prior Publication Data

US 2013/0018579 A1 Jan. 17, 2013

Related U.S. Application Data (63) Continuation of application No. 11/843,748, filed on Aug. 23, 2007, now Pat. No. 8,364,397.

(51) Int. Cl.
*G01C 21/00* (2006.01)
*G01C 21/32* (2006.01)
(Continued)

(52) U.S. Cl.
CPC ...... *G06F 17/30265* (2013.01); *G01C 21/3647* (2013.01)
USPC ............ 701/436; 701/400; 701/431; 701/439

(58) Field of Classification Search
USPC ......... 701/400, 408, 409, 428, 436, 437, 438, 701/439, 454, 455, 457, 460; 340/944, 988, 340/995.1, 995.19, 995.24, 995.27
See application file for complete search history.

(56) References Cited

U.S. PATENT DOCUMENTS 4,490,717 A * 12/1984 Saito .............................. 340/996
4,857,902 A * 8/1989 Naimark et al. .............. 345/167
(Continued)

FOREIGN PATENT DOCUMENTS

DE 102004020158 A1 10/2005
EP 0375816 A 4/1990
(Continued)

OTHER PUBLICATIONS

U.S. Appl. No. 11/843,748, filed Aug. 23, 2007.
(Continued)

*Primary Examiner* — Nicholas Kiswanto
(74) *Attorney, Agent, or Firm* — Patrick J. Daugherty; Driggs, Hogg, Daugherty & Del Zoppo Co., LPA (57) ABSTRACT

Pictorial information is provided relevant to a geographic location through selecting characteristics relevant to geographic locations, searching pictorial image databases for images having an embedded tags associated with the characteristics, retrieving image files from databases having embedded tags correlated to characteristics and visually depicting a physical appearance or an attribute of a location, analyzing characteristics image files and responsively selecting preferred image data, formatting preferred image data for presentation to a traveler, associating formatted preferred data with geographic locations, and presenting associated formatted data to the traveler in association with geographic locations. Characteristics include global positioning satellite coordinates. Image data may be selected having preferred image resolutions or perspectives. Formatting pictorial information may comprise synthesizing photographs into a constructs. Associated image data may indicate a distance and direction from a geographic location. Routing system applications are enabled to present pictorial information with navigation route points.

16 Claims, 4 Drawing Sheets

(51) Int. Cl.
*G06F 17/30* (2006.01)
*G01C 21/36* (2006.01)

(56) References Cited

U.S. PATENT DOCUMENTS

| | | | |
|---|---|---|---|
| 4,873,513 A * | 10/1989 | Soults et al. | 345/27 |
| 6,278,938 B1 | 8/2001 | Alumbaugh | |
| 6,453,056 B2 | 9/2002 | Laumeyer et al. | |
| 6,714,860 B1 | 3/2004 | Wawra et al. | |
| 7,577,316 B2 * | 8/2009 | Di Bernardo et al. | 382/305 |
| 7,720,596 B2 * | 5/2010 | Kobuya et al. | 701/426 |
| 7,733,244 B2 * | 6/2010 | Asada | 340/995.1 |
| 7,917,286 B2 * | 3/2011 | Taylor et al. | 701/468 |
| 7,933,395 B1 * | 4/2011 | Bailly et al. | 379/201.04 |
| 8,280,405 B2 * | 10/2012 | Sanz-Pastor et al. | 455/456.2 |
| 2004/0174434 A1 * | 9/2004 | Walker et al. | 348/211.3 |
| 2004/0193371 A1 | 9/2004 | Koshiji et al. | |
| 2005/0174591 A1 * | 8/2005 | Sowinski et al. | 358/1.9 |
| 2006/0287819 A1 * | 12/2006 | Brulle-Drews et al. | 701/211 |
| 2007/0150188 A1 * | 6/2007 | Rosenberg | 701/211 |
| 2007/0273758 A1 * | 11/2007 | Mendoza et al. | 348/39 |
| 2008/0033641 A1 * | 2/2008 | Medalia | 701/209 |
| 2008/0134237 A1 * | 6/2008 | Tu et al. | 725/38 |
| 2008/0270161 A1 * | 10/2008 | Cohen et al. | 705/1 |

FOREIGN PATENT DOCUMENTS

| | | |
|---|---|---|
| JP | 2003-337032 A | 11/2003 |
| JP | 2005147674 A | 9/2005 |

OTHER PUBLICATIONS

Non-Final Office Action (mail date Jun. 9, 2011) for U.S. Appl. No. 11/843,748, filed Aug. 23, 2007.
Response (filed Sep. 9, 2011) to Non-Final Office Action (mail date Jun. 9, 2011) for U.S. Appl. No. 11/843,748, filed Aug. 23, 2007.
Final Office Action (mail date Jun. 20, 2012) for U.S. Appl. No. 11/843,748, filed Aug. 23, 2007.
Response (filed Aug. 23, 2012) to Final Office Action (mail date Jun. 20, 2012) for U.S. Appl. No. 11/843,748, filed Aug. 23, 2007.

* cited by examiner

PICTORIAL NAVIGATION

CROSS REFERENCE TO RELATED APPLICATION

The subject application is a continuation of U.S. application Ser. No. 11/843,748, filed Aug. 23, 2007.

FIELD OF THE INVENTION

The present invention generally relates to utilizing image information in navigation and, more particularly, to methods, systems, and program products for incorporating pictorial navigation aids into navigation devices and systems. It is also amenable to other applications in which it is desirable to convey information through graphic image communications.

BACKGROUND OF THE INVENTION

A wide variety of navigational aids systems and devices are available to help with finding a desired destination. Static directional information may be generated through user inputs to computer system or processor applications: examples include printed text directions or map images with route highlights provided by mapping applications. However, static directional navigation information prepared and generated prior to embarkation may be difficult or inefficient to use as a traveler's position changes in real-time, and may even be rendered useless due to unanticipated changes or detours in the actual route taken. Some static route system disadvantages may be overcome by real-time navigation processes, for example by using Global Positioning Satellite (GPS) communications to continuously track current geographic position and responsively update navigational directions through text, map images and even narrative sound modules. Such real-time devices can thus provide advantages over static systems with contextual information updates, including audio prompts (e.g. "turn right in 10 seconds").

However, the abstract nature of the navigational information presented by both conventional static and real-time systems presents problems in user application to real-world travel scenarios. For example, processing and translating audio cues into meaningful information in the context of understanding and reacting to the vistas presented to the moving traveler is difficult, particularly for unfamiliar destinations. And generally it is easier for a traveler, and in particular a vehicle driver, to visually scan ahead for recognized landmarks or other expected items rather than hear, process and interpret text, map graphic imagery or audio information. Moreover, some unfamiliar destinations may be unrecognizable due to problems in understanding and processing textual, map or audio information.

Some systems address some of these problems by providing satellite or aerial photograph imagery of the actual destinations, thus providing images less abstract and more relevant to the actual locations being navigated by the user. However, the substantially over-head perspective of such aerial or satellite imagery, along with the distant perspective of the device used to acquire the image, limits their ability to convey comprehensive, detailed and meaningful visual information to a traveler seeing a destination from a much closer vantage point, and typically from a horizontal perspective. Thus satellite or aerial photograph imagery provide yet another abstract representation of the actual destination that must, as with textual and audio information, be processed and translated by the user in order to understand its relationship to the actual visual appearance of a given destination.

Moreover, prior art over-head imagery, text, maps and audio information are inherently insufficient with respect to some desired information. For example, searching for an acceptable restaurant may require additional appearance information: does the restaurant look well-run and maintained? Is it located in a pleasant area? Is there a play area for children, and if so is the play area adequate in terms of design? Are the amenities outdoors and subject to the weather? (What is acceptable on a nice temperate day may be unacceptable in extreme weather.)

SUMMARY OF THE INVENTION

The present invention relates to methods, systems and program products for providing pictorial information relevant to a geographic location. Thus, a method comprises selecting a characteristic relevant to a geographic location; searching a pictorial image database for images having an embedded tag associated with the characteristic; in response to searching, retrieving at least one image file from the database having an embedded tag correlated to the geographic location characteristic and visually depicting a physical appearance or an attribute of the location; analyzing characteristics of the at least one image file and responsively selecting preferred image data from the at least one image file; formatting the preferred image data for presentation to the traveler; associating the formatted preferred image data with the geographic location; and presenting the associated formatted preferred image data to the traveler in association with the geographic location.

In another aspect of a method, a characteristic comprises global positioning satellite coordinates, the method comprising selecting the characteristic by determining global positioning satellite coordinates of a geographic location, searching a database comprises comparing determined geographic global positioning satellite coordinates to global positioning satellite coordinate tags embedded in image files, and retrieving at least one image file comprises retrieving image files having embedded global positioning satellite coordinates tags correlated to the determined global positioning satellite coordinates.

In another aspect, a method comprises analyzing characteristics and responsively selecting preferred image data by selecting photographs each having a preferred image resolution or selecting image files presenting a horizontal perspective representation of the location. In one aspect a method comprises formatting preferred pictorial information by synthesizing a plurality of photographs into a construct representative of the geographic location. In another aspect a method comprises associating formatted preferred image data with the geographic location indicating a distance and direction of the formatted preferred image data from the geographic location. And in one aspect geographic locations are a plurality of navigation route points generated by a routing system application, and a method comprises enabling the routing system application to present the associated pictorial information to the traveler in association with each of the navigation route points.

In one method, a computer infrastructure is provided, for example by a service provider who offers to implement, deploy, and/or perform functions for others, the computer infrastructure being operable to select a characteristic relevant to a geographic location; search a pictorial image database for images having an embedded tag associated with the characteristic; in response to the search, retrieve at least one image file from the database having an embedded tag correlated to the geographic location characteristic and visually depicting a physical appearance or an attribute of the location; analyze characteristics of the at least one retrieved image file and responsively select preferred image data from the at least one retrieved image file; format the preferred image data for presentation to the traveler; associate the formatted preferred image data with the geographic location; and present the associated formatted preferred image data to the traveler in association with the geographic location.

In another aspect, a computer infrastructure is provided being operable to identify a characteristic by determining global positioning satellite coordinates of a geographic location; search a database by comparing the determined global positioning satellite coordinates to digital image location tags embedded in image files; and retrieve at least one image file by retrieving image files having embedded global positioning satellite coordinates tags correlated to the determined global positioning satellite coordinates. In another aspect a computer infrastructure is provided being operable to analyze characteristics and responsively select preferred image data by selecting photographs each having a preferred image resolution or selecting image files presenting a horizontal perspective representation of the location. In another aspect a computer infrastructure is provided being operable to format preferred pictorial information by synthesizing a plurality of photographs into a construct representative of the geographic location. In one aspect a computer infrastructure is provided being operable to associate formatted preferred image data with geographic location by indicating a distance and direction of formatted preferred image data from the geographic location. And in one aspect geographic locations are a plurality of navigation route points generated by a routing system application, wherein a computer infrastructure is provided being operable to enable the routing system application to present the associated pictorial information to the traveler/user in association with each of the navigation route points.

In another aspect, a method comprises producing computer executable program code; storing the code on a computer readable medium; and providing the program code to be deployed and executed on a computer system. The program code comprises instructions which, when executed on the computer system, cause the computer system to select a characteristic relevant to a geographic location; search a pictorial image database for images having an embedded tag associated with the selected characteristic; in response to the search, retrieve at least one image file from the database having an embedded tag correlated to the selected characteristic and visually depicting a physical appearance or an attribute of the location; analyze characteristics of the at least one image file and responsively select preferred image data from the at least one image file; format the preferred image data for presentation to the traveler/user; associate the formatted preferred image data with the geographic location; and present the associated formatted preferred image data to the traveler/user in association with the geographic location.

In one aspect, program code instructions, when executed on a computer system, cause the computer system to identify relevant characteristic by determining global positioning satellite coordinates of a geographic location; search a database by comparing determined global positioning satellite coordinates to digital image location tags embedded in image files; and retrieve at least one image file by retrieving image files having embedded global positioning satellite coordinates tags correlated to the determined global positioning satellite coordinates. In another aspect program code instructions, when executed on a computer system, cause a computer system to analyze characteristics and responsively select preferred image data by selecting photographs each having a preferred image resolution or selecting image files presenting a horizontal perspective representation of the location. In still another aspect program code instructions, when executed on a computer system, cause the computer system to format preferred pictorial information by synthesizing a plurality of photographs into a construct representative of the geographic location. In one aspect, program code instructions, when executed on a computer system, cause the computer system to associate formatted preferred image data with geographic location by indicating a distance and direction of the formatted preferred image data from the geographic location. And in another aspect, wherein the geographic location is a plurality of navigation route points generated by a routing system application, program code instructions, when executed on a computer system, cause the computer system to enable a routing system application to present the associated pictorial information to the user in association with each of the navigation route points.

In still another aspect, a system is provided comprising an identifier configured to identify a characteristic of a geographic location; a retriever configured to search a pictorial image database for images having an embedded tag associated with the identified characteristic and retrieve at least one image file from the database having an embedded tag correlated to the identified characteristic and visually depicting a physical appearance or an attribute of the location; an analyzer configured to analyze characteristics of the at least one image file and responsively select preferred image data from the at least one image file; a formatter configured to format the preferred image data for presentation to the traveler/user; and a presenter configured to associate the formatted preferred image data with the geographic location and present the associated formatted preferred image data to the traveler/user in association with the geographic location.

In one aspect, a system identifier is configured to determine the identified characteristic by determining global positioning satellite coordinates of the geographic location, and a retriever is configured to compare the determined global positioning satellite coordinates to digital image location tags embedded in image files and retrieve image files having embedded global positioning satellite coordinates tags correlated to the determined global positioning satellite coordinates. In another aspect a system analyzer is configured to select photographs each having a preferred image resolution or image files presenting a horizontal perspective representation of the location. In still another aspect a system formatter is configured to synthesize a plurality of photographs a construct representative of the geographic location.

In one aspect, a system presenter is configured to indicate a distance and direction of the formatted preferred image data from the geographic location. And in another aspect wherein geographic locations are a plurality of navigation route points generated by a routing system application, a system presenter is configured to enable a routing system application to present the associated pictorial information to the traveler/user in association with each of the navigation route points.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections: I. General Description, and II. Computerized Implementation.

I. General Description.

Figure 1:
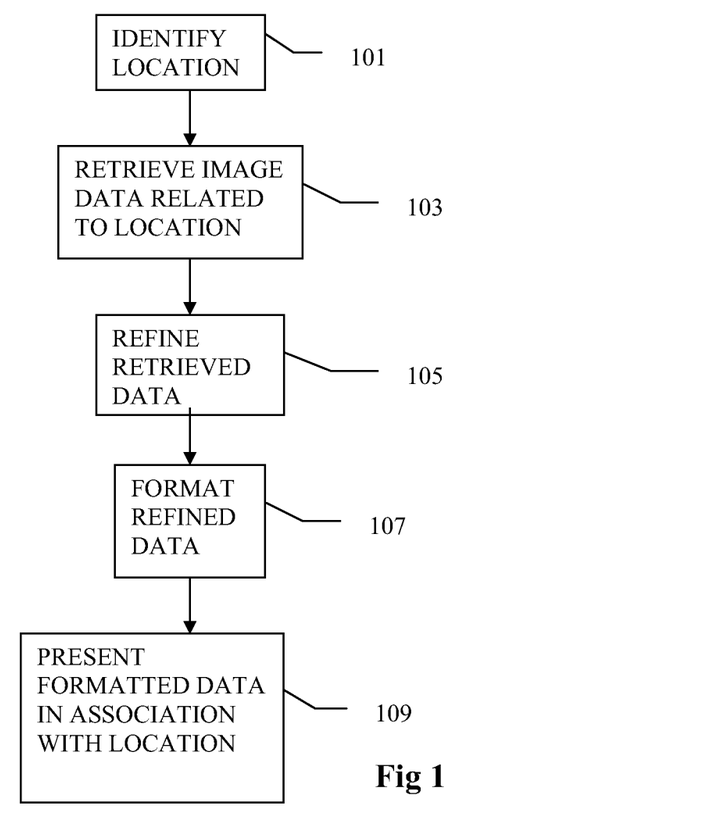
FIG. 1 illustrates a system and process for providing pictorial information relevant to a geographic location.

Referring now to FIG. 1, a high-level illustration of a method and system for acquiring and using pictorial information is illustrated. At 101 a geographic location is identified. At 103 an image selection process is performed with respect to the identified location, wherein pictorial information relevant to one or more characteristics of the identified location is selected and retrieved. The retrieved pictorial information includes photographs and any other graphic images representative of a physical appearance of the location that will help a traveler recognize the location upon an arrival thereat and/or evaluate an attribute of the location. Thus in some examples pictorial information advertising graphic images including business names and logos used in exterior signage, and tradedress architectural images representative of actual building exteriors may be appropriately associated with a business location. Photos or graphic images of location details or interiors may also be retrieved and provided, for example including restaurant interiors, public or private amenities such as pools and play grounds, and/or graphic representations thereof.

At 105 the retrieved pictorial information is analyzed and if necessary subject to additional selection, refinement or processing in order to identify a most relevant subset image or plurality of images for association and use with the identified location. Thus, for example if only one photograph is retrieved at 103, that single photograph is associated with the identified location; however, if a plurality of images are returned at 103, then the returned information is analyzed and a subset of one or more of the returned images is selected for association. And, generally dependent upon the characteristics of the subset information or of the processes used for said subset selection, the information is formatted for presentation to a traveler/user in association with the identified location 107. And if not already done so at 107, the user is presented with the formatted and associated information at 109.

Figure 2:
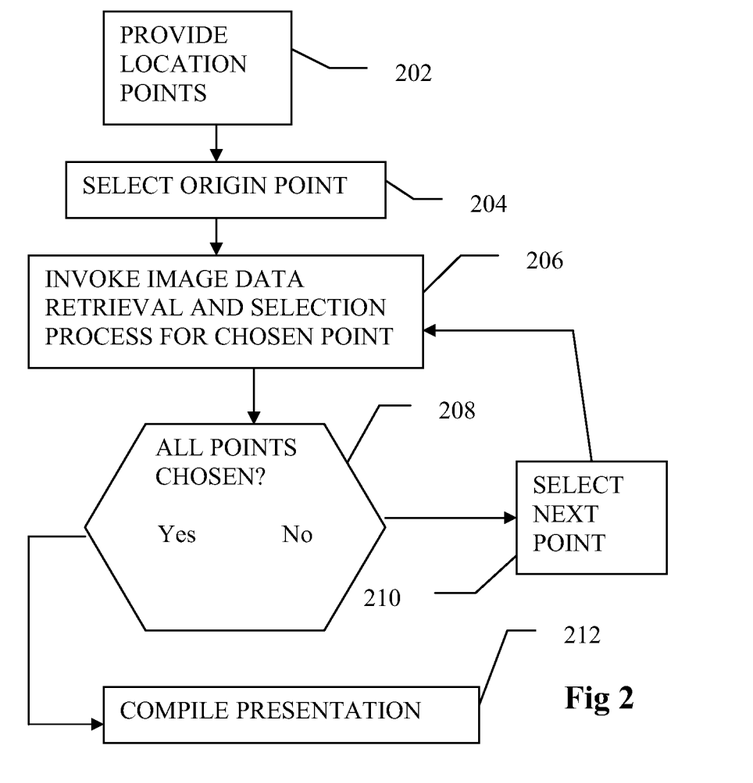
FIG. 2 illustrates a system and process for providing pictorial information relevant to one or more location points.

FIG. 2 illustrates a method and system for acquiring and using pictorial information with respect to a navigation route or other plurality of discrete location points. At 202 one or more physical location points are provided, for example navigation route origin, waypoint and destination points generated by a static or real-time routing system application or device. The type of navigational system is not critical, and one skilled in the art will appreciate that the present system and method may be adapted for use with many types of navigational systems and devices. Moreover, it is to be understood the present system and method may be applied outside of navigational system applications, and thus for example to any pluralities of identified locations. At 204 a first one of the location points is chosen, such as for example a route origin point or a current location determined by a real-time GPS device. At 206 image selection processes 101/103/105 are performed with respect to the chosen location, and thus pictorial information relevant to one or more characteristics of the chosen location is selected and retrieved for presentation to the user. At 208 and 210 the system and method selects each of the remaining plurality of location points (for example, route turn, waypoint, and/or final destination points) and repeats the pictorial information selection and retrieval process for each location point until no more locations exist. The process ends with compilation of selected retrieved information into a presentation to a user at 212, thus including formatting 107 and presentation 109 processes, which may be performed for individual or pluralities of the location points.

In one aspect, the retrieved pictorial information is selected to provide photographic navigation aids which allow travelers to visualize the route they are taking, enabling travelers to see photos of where they are going, such as landmarks along the way, and what the final destination looks like. This will help people become more familiar with a new route, better visualize where they need to make turns, and help choose a destination.

In particular, providing photographs near or at locations of turns permits travelers to anticipate such upcoming turns. And improved turn anticipation, without the need to look for street signs or other in-place navigational aids, results in travelers missing fewer desired intersections, as well as effectively increasing turn preparation times, whether walking or driving.

Moreover, photograph or graphic image information may rapidly impart a wealth of information to a traveler in a more time efficient manner compared to text-based information techniques. Thus improvements are provided over prior art navigation systems which require a traveler to search a text guidebook or enter search terms into a GPS device for information retrieval from database accessed by or stored on the device, which generally results in text information outputs, and which even then may return incomplete or inadequate information. For example, text information that a restaurant at a chosen location has a play area does not generally indicate whether the play area is inside and climate-controlled or outside, and if outside whether sheltered from the sun, wind or rain or exposed to the elements, information that may be both critical to a traveler traveling in extreme weather conditions and readily and instantly ascertainable from one or more pictures or graphic images.

Pictorial information may also efficiently and rapidly provide information about areas surrounding the chosen location. The traveler is thus provided with advance knowledge of a significant landmark near the location, such as water tower or distinct building, which may be spotted well in advance of arrival at the location and thus aid navigation thereto. Pictorial information may also give an immediate impression of qualities of locations and/or areas nearby, rapidly and efficiently providing information beyond text media communication capabilities, such as for example allowing a traveler to form an opinion as to whether a location looks well maintained, is safely lit, affords on-street parking, has sufficiently large, accessible and/or child-friendly pedestrian pathways and amenities, or offers a pleasant and inviting overall vista.

Figure 3:
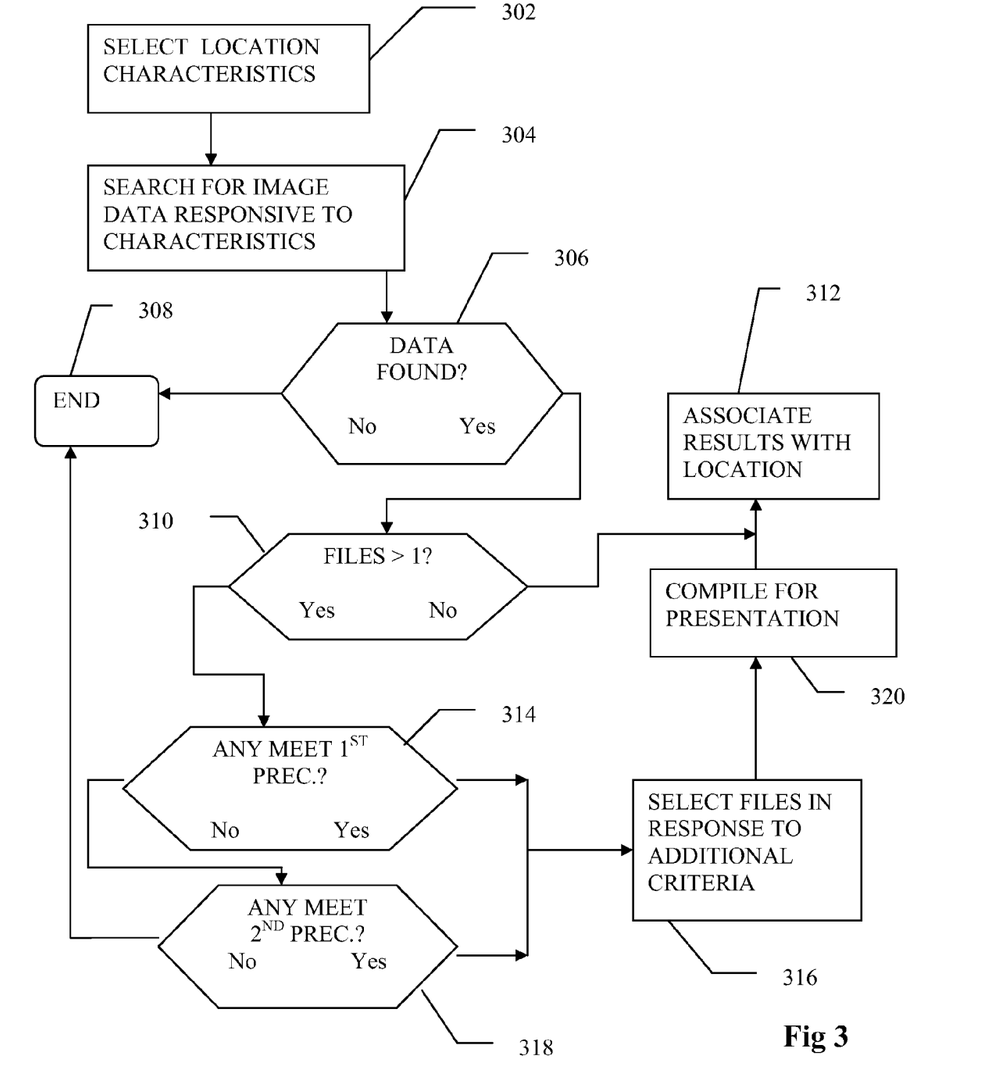
FIG. 3 illustrates a system and process for providing pictorial information relevant to location characteristics.

Accordingly, in one aspect, one or more characteristics may be selected and used to retrieve pictorial information, and/or select preferred images or image subsets from the retrieved pictorial information, for example to present selected pictorial information for presentment in further of one or more of the objectives discussed above, as well as others. FIG. 3 illustrates an example of a pictorial information selection and retrieval process according to the present invention, in one aspect adaptable to the selection and retrieval processes and systems illustrated in FIGS. 1 and 2 and discussed above. At 302 one or more characteristics are determined as relevant to a chosen location and which may be used to search for and retrieve relevant pictorial information.

More particularly, in addition to image data, digital photos and other image files frequently incorporate discrete informational fields or "tags" which comprise discrete informational fields. Exemplary tags include the following suggested for incorporation by the International Press Telecommunications Council (IPTC): caption, a narrative description of the image subject and related subject data; keywords: a list of discrete words related to image subject matter; photographer name and/or employing agency name; copyright information; date of image creation; city; province/state; country; special instructions, which may list restrictions on image usage; byline field; category code, related to media characterization; headline subject data, a short form of subject matter narrative; and source, the provider of the image. Embedded tags may also include GPS tags: for example, GPS-Photo Link software by GeoSpatial Experts, LLC enables a digital camera to import GPS coordinates from a GPS unit in communication with the camera and embed the coordinates into a digital photo file. Accordingly, in one embodiment having tags or other identifiers correlated with characteristics selected and identified at 204. at 304, one or more image databases or search services are searched for digital images Examples of search services and searchable databases include Google Images™, Flickr.com™, Lexus/Nexus®, The Associated Press, and Reuters Group PLC, though other services and databases may be utilized. Any of the tag information discussed thus far, as well as other tags or identifying characteristics, may thus be used for searching for relevant digital images. In one embodiment GPS coordinates associated with a chosen location are ascertained at 302 and used to retrieve images with correlated GPS tags at 304. Other geographic indicia search examples include street addresses, proximate cross-street identifications, United States census tract or postal zip code, governmental entity (municipality, county, and/or state, nation, continent, etc.); geographic features such as waterways, bodies of water, mountains, bridges, railroad tracks; identified locations such as parks, resorts, stadiums, airports. Non-geographic tag data may also be identified as relevant to a location and used for general keyword and search term searching tag searching, for example including facility or occupant names or location use related subject matters, and still other useful search criteria as will be appreciated by one skilled in the art.

If a plurality of characteristics is used, each may be used singly or in combinations in search and retrieval processes. Multiple characteristic searching may also incorporate different weightings assigned to each characteristic: in one example GPS coordinate indicia may be given more weight than street address indicia or name search characteristics in a combined geographic indicia selection and retrieval. Thus, it is to be understood that the specific characteristics used are not critical, nor their specific combinations and weightings, and one skilled in the art may select and weight one or more characteristics based upon what is needed or preferred in a given application in furtherance of the purposes of the inventions.

If no pictorial information is found or retrieved in response to the search, then at 306 the process is ended at 308. Else, if only one image is returned by the search, then at 310 that image is associated with the chosen location at 312 and the process ended at 308. And in another aspect, if a plurality of image items is returned by the search, then the search results are analyzed with respect to at least one characteristic at 314, in order to further select or refine the image selection for association.

Thus, in one example at 314, a primary standard or criteria is applied to the search results. Thus, where one or more items has been retrieved at 304, rather than associate each and every item with the chosen location, one or more of the characteristic values used to select each item, and/or additional characteristic values associated with each item or the chosen location, may be utilized to select a preferred item or set of items for association with the location. In one aspect, characteristic values of items may be compared to the other retrieved item values and/or to a primary threshold, and those items with best or better values and/or equal to or greater than the primary threshold may be selected to populate a primary precision subset. In one example, one or more pictorial information items having GPS coordinates closest to or within a threshold distance from chosen location GPS coordinates may be selected. In another example a primary precision may relate to image quality, for example selecting one or more photographic items having the best resolution or a resolution at or over a given threshold.

In another example, photo perspective directions and/or view angles and selecting may be considered in order to retrieve and/or select one or more items having perspectives and/or view angles best correlated with an expected view of a user as determined from the computed route, or within a threshold value from said expected view perspective. Time of image generation may be considered, for example selecting one or more most recent photos or photos taken within a threshold elapsed time of travel or route generation event, or selecting one or more most recent photos at a similar time of day as the current time of day. One or more most comprehensive photos may be selected based on one or more desired field-of-view criteria: for example, the scale or size of an image field-of-view may be evaluated and selected in response to an anticipated speed of a navigational system user, wherein images including entire areas or multiple structures or items may be selected over more zoomed-in images for anticipated travel along a high-speed interstate, and wherein zoomed-in images are instead preferred for low speed road travel through a business district road.

In another aspect, where a primary precision subset selected at 314 comprises more than one item, or a number greater than some other threshold, then at 316 an additional level of precision may be applied to a step 314 primary precision subset in order to further refine and reduce the items selected for association with the chosen location. The additional refinement process at 316 may apply one or more of the same or similar criteria and characteristics, or one or more may differ. Thus, in one example, geographic criteria (such as GPS proximity) may be applied to determine the primary precision subset at 314, and then a photo resolution comparison process may be applied at 316 to select a best item or best group of pictorial information items. It will also be appreciated that other criteria for refining pictorial information selections will be apparent to one skilled in the art, and the present invention is not limited to the examples provided herein, or to this exemplary application. Moreover, if more than one characteristic is used in any one process, or in multiple processes, then one or more of the characteristics may be weighted differently from others in making said determination (thus for example, GPS coordinate information may be weighted greater than address criteria in selecting items through geographic criteria).

In another aspect, if none of the retrieved pictorial information meets the primary precision selection criteria at 314, then at 318 it may be determined whether any of the retrieved pictorial information is within a secondary level of precision, and thus relevant or proximate enough to the chosen location in order to be associated with the chosen location. Thus, in one example where each of the pictorial information items retrieved at 304 have GPS coordinates too far from chosen location GPS coordinates as determined in a primary precision determination at 314, then at 318 one or more items having GPS coordinates close to or within a second threshold distance from the chosen location GPS coordinates may be selected to form a secondary subset. In one example the second precision subset items are then associated with the chosen location along with proximity information at 320 indicating a specific geographic relationship to the chosen location, for example descriptor information indicating distance and direction of the associated image or group of images from the actual current location. It will also be understood that where a plurality of secondary level items are selected at 318, the items selected may be further subject to an additional refinement or selection process, similar to the additional process at 316 described above with respect to the primary subject selection process at 314.

Pictorial information thus selected for association with the chosen locations at 310, 314, 316, 318 and 320 is formatted for presentation to a system and process user at 312 in association with each chosen location. Relevant associated photographs may thus be transmitted to mobile devices as a user progresses through a chosen route to a destination, or in some applications a montage or loose collection of germane photographs may be pulled from central or distributed repositories and presented as a navigational aid, for example in advance of a trip. Thus, in some embodiments, if a plurality of items are selected for association with any one chosen location, then each of the items may be presented or enabled for selection, such as through a plurality of thumbnail images on one page or screen, or through screen scrolling or slideshow presentation techniques. A variety of presentation methods and systems will be apparent to one skilled in the art, and the present examples are illustrative but not exhaustive of the present system and method.

In another aspect, the association and presentation of pictorial information at 312 may comprise an image synthesis process, wherein a plurality of image items may be combined into a composite image or image application. One exemplary photo synthesis process is Photosynth™ by Microsoft Live Labs™, wherein a plurality of photos associated with a geographic location are analyzed for similarities and then combined to form a photographic three-dimensional reconstruction model of the location, one that may optionally be manipulated by computer processor interface zooming and panning controls. Thus, in one example of the present system and method, a three-dimensional abstraction of a chosen location (or of a proximate location or area as determined at 318 and 320) may be constructed from retrieved pictorial information, and also optionally incorporating other data. A photograph synthesis process may also enable the creation of a best-possible photograph or image from a collection of photographs and/or images that are otherwise deficient individually in conveying desired information, thus additively combining visual information to create useful and relevant pictorial information. Or one or more items may be presented based upon user or system indicia inputs: thus if a user wants a close image, one or more zoomed-in images of an associated item set may be presented, or a synthesized construct "zoomed" in through some active Photosynth™ application.

Moreover, it will be understood that Photosynth™ is only one example of a photo synthesis application, and one skilled in the art will appreciate that other photo synthesis applications and processes may be incorporated into the present invention, and that the present invention is not limited to the embodiments described thus far.

Thus, the present invention provides advantages in allowing for the selection and presentation of pictorial navigation aids to real-time navigation devices, as well as static direction information, by exploiting positional information embedded in photos and other pictorial items. The present invention thus enables users to see photos or images of where they are going, such as landmarks along the way and what the final destination looks like. This helps users become more familiar with a new route, better visualize where they need to make turns, and make educated choices in destination.

Thus, through use of the present invention, relevant photographs may be transmitted to mobile devices as a user progresses through a chosen route to a destination, or a montage/loose collection of germane photographs may be pulled from central or distributed repositories and presented as a navigational aid in advance of the trip. Additionally, the invention may utilize known technologies such as photograph synthesis to create a best possible photograph from a collection of photographs, and accordingly, such synthesized photographs can then provide real-time navigational aids.

And as the associated photographs may be found, synthesized, and/or compiled from one or more sources, optionally including user-designated sources, the present invention enables extension of conventional navigation system route creation and presentation processes into additional and richer data sets and responsive creation options. By enabling the use and search of user-driven sites, such as for example Myspace.com™, Tripadvisor.com™ or Flickr.com™, and/or one or more available web-logs (blogs), a user may extend navigation route creation into creating routes and information tailored to his individual preferences and needs. Thus, a user may search for results from particular site user profiles or known site users to return additional specialized recommendations, suggested waypoints, and/or images. In some examples, a recreational skateboarder may find and retrieve skate-park proximate to chosen locations, as well as images correlated thereto, or a music fan may include a designated music website or blog in a search for image and/or location correlations. Still other applications will be apparent to one skilled in the art.

II. Computerized Implementation.

Figure 4:
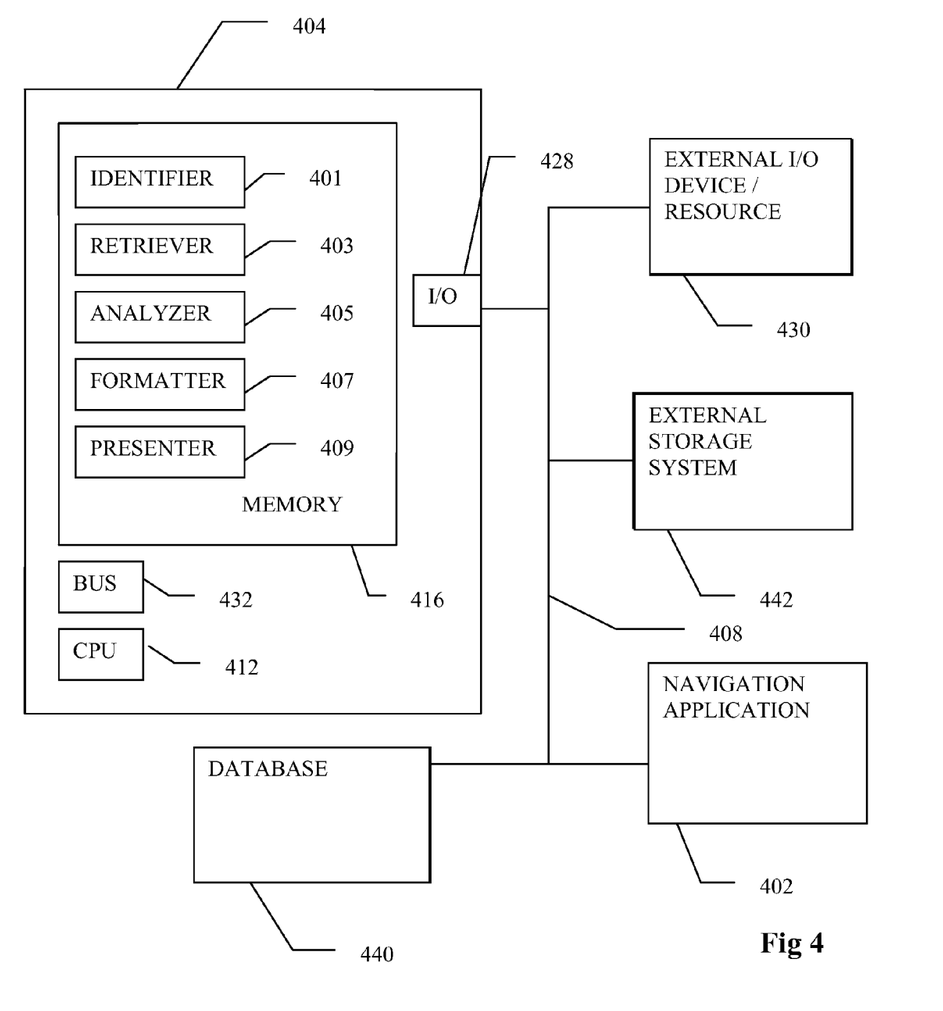
FIG. 4 illustrates an exemplary computerized implementation of a system and process for providing pictorial information relevant to a geographic location.

Referring now to FIG. 4, an exemplary computerized implementation includes a computer system 404 deployed within a network computer infrastructure 408. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure 408 is intended to demonstrate that some or all of the components of implementation could be deployed, managed, serviced, etc. by a service provider who offers to implement, deploy, and/or perform the functions of the present invention for others. As shown, the computer system 404 includes a central processing unit (CPU) 412, a memory 416, a bus 432, and input/output (I/O) interfaces 428. Further, the computer system 404 is shown in communication with external I/O devices/resources 430 and storage system 442. In general, the processing unit 412 executes computer program code, such as the code to implement various components of the methods and systems described above for searching and retrieving pictorial information from databases 440 in communication with the computer system 404, and for the formatting, associating and presentation thereof with respect to chosen locations, which may be stored in memory 416 and/or the storage system 442. It is to be appreciated that two or more, including all, of these components may be implemented as a single component.

While executing computer program code, the processing unit 412 can read and/or write data to/from the memory 416, the storage system 442, and/or the I/O interfaces 428. The bus 432 provides a communication link between each of the components in computer system 404. The external devices 430 can comprise any devices (e.g., keyboard, pointing device, display, etc.) that enable a user to interact with computer system 404 and/or any devices (e.g., network card, modem, etc.) that enable computer system 404 to communicate with one or more other computing devices.

The computer infrastructure 408 is only illustrative of various types of computer infrastructures for implementing the invention. For example, in one embodiment, computer infrastructure 408 comprises two or more computing devices (e.g., a server cluster) that communicate over a network to perform the various process steps of the invention. Moreover, computer system 404 is only representative of various possible computer systems that can include numerous combinations of hardware.

To this extent, in other embodiments, computer system 404 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 412 may comprise a single processing unit, or be distributed across one or more processing units in one or more locations, e.g., on a client and server. Similarly, the memory 416 and/or the storage system 442 can comprise any combination of various types of data storage and/or transmission media that reside at one or more physical locations.

Further, I/O interfaces 428 can comprise any system for exchanging information with one or more of the external device 430. Still further, it is understood that one or more additional components (e.g., system software, math co-processing unit, etc.) not shown in FIG. 4 can be included in computer system 404. However, if computer system 404 comprises a handheld device or the like, it is understood that one or more of the external devices 430 (e.g., a display) and/or the storage system 442 could be contained within computer system 404, not externally as shown.

The storage system 442 can be any type of system (e.g., a database) capable of providing storage for information under the present invention. To this extent, the storage system 442 could include one or more storage devices, such as a magnetic disk drive or an optical disk drive. In another embodiment, the storage system 442 includes data distributed across, for example, a local area network (LAN), wide area network (WAN) or a storage area network (SAN) (not shown). In addition, although not shown, additional components, such as cache memory, communication systems, system software, etc., may be incorporated into computer system 404.

Shown in the memory 416 of computer system 404 is a system of logic components 401-409 configured to provide pictorial information relevant to a geographic location to a computer system application 402 configured to produce navigation and routing services, more particularly to perform the functions illustrated in FIG. 1 and discussed above. An identifier 401 is configured to identify a characteristic of a geographic location, as discussed above relative to element 101 of FIG. 1. A retriever 403 is configured to search a pictorial image database for images associated with an identified characteristic and retrieve at least one correlated image file visually depicting a physical appearance or an attribute of the location from the database, as discussed above relative to element 103 of FIG. 1. An analyzer 405 is configured to analyze image file characteristics and responsively select preferred image data, as discussed above relative to element 105 of FIG. 1. A formatter 407 is configured to format the preferred image data for presentation to a user, as discussed above relative to element 107 of FIG. 1. And a presenter 409 is configured to associate the formatted image data with correlated locations and present the associated data to a user in association with the locations, as discussed above relative to element 109 of FIG. 1. In another implementation, two or more of the components 401-409, including all of the components 401-409, can be a single component.

While shown and described herein as a method and a system, it is understood that the invention further provides various alternative embodiments. For example, in one embodiment, the invention provides a computer-readable/useable medium that includes computer program code to enable a computer infrastructure for providing pictorial information relevant to a geographic location. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 416 and/or the storage system 442 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to provide pictorial information relevant to geographic locations. In this case, the service provider can create, maintain, support, etc., a computer infrastructure, such as the computer infrastructure 408 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing pictorial information relevant to a geographic location. In this case, a computer infrastructure, such as computer infrastructure 408, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 404, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for providing pictorial information relevant to a geographic location, the method comprising:
    determining via a processing unit global positioning satellite coordinates of a geographic location of a navigation route point of a route computed for a traveler;
    searching via the processing unit a plurality of images within a pictorial image database for images that each have at least one attribute selected from a group of attributes of the geographic location comprising a first attribute of an embedded global positioning satellite coordinate tag that is within a threshold distance from the determined global positioning satellite coordinates, a second attribute of visually depicting a physical appearance of the location in a horizontal perspective and at a view angle correlated with an expected view of the traveler from the computed route and taken at a similar time of day as a current time of day, a third attribute of depicting exterior business logo signage of a business at the location, and a fourth attribute of depicting a trade-dress architectural building exterior of the business at the location;
    retrieving via the processing unit a plurality of the searched images that have at least one of the attributes selected from the group of attributes;
    selecting via the processing unit a scale of field-of-view of images in response to an anticipated speed of the traveler on the computed route;
    selecting via the processing unit at least one of the plurality of retrieved images that has the selected scale of field-of-view and is more relevant for association and use with the identified location than others of the plurality of retrieved images; and
    presenting via the processing unit the selected at least one image to the traveler at the selected scale of field-of-view and in association with the geographic location navigation route point.

2. The method of claim 1 wherein the selecting the scale of field-of-view of the selected at least one image in response to the anticipated speed of the traveler on the computed route comprises selecting a low-speed scale of field-of-view for anticipated travel along a low speed road that is more zoomed-in than a high-speed scale of field-of-view selected for anticipated travel along a high-speed road.

3. The method of claim 1 wherein the selecting the scale of field-of-view of the selected at least one image in response to the anticipated speed of the traveler on the computed route comprises selecting a first scale of view that includes a plurality of structures for anticipated travel along a high-speed interstate, and selecting a second scale of view that is more zoomed-in than the first scale of view for low speed road travel through a business district road.

4. An article of manufacture, comprising:
    a computer readable tangible storage medium having executable program code embodied therewith, the program code comprising instructions which, when executed on a computer system, cause the computer system to:
    determine global positioning satellite coordinates of a geographic location of a navigation route point of a route computed for a traveler;
    search a plurality of images within a pictorial image database for images that each have at least one attribute selected from a group of attributes of the geographic location comprising a first attribute of an embedded global positioning satellite coordinate tag that is within a threshold distance from the determined global positioning satellite coordinates, a second attribute of visually depicting a physical appearance of the location in a horizontal perspective and at a view angle correlated with an expected view of the traveler from the computed route and taken at a similar time of day as a current time of day, a third attribute of depicting exterior business logo signage of a business at the location, and a fourth attribute of depicting a trade-dress architectural building exterior of the business at the location;
    retrieve a plurality of the searched images that have at least one of the attributes selected from the group of attributes;
    select a scale of field-of-view of images in response to an anticipated speed of the traveler on the computed route;
    select at least one of the plurality of retrieved images that has the selected scale of field-of-view and is more relevant for association and use with the location than others of the plurality of retrieved images; and
    present the selected at least one image to the traveler at the selected scale of field-of-view and in association with the geographic location navigation route point.

5. The article of manufacture of claim 4, wherein the program code instructions, when executed on the computer system, further cause the computer system to select the scale of field-of-view of the selected at least one image in response to the anticipated speed of the traveler on the computed route by selecting a low-speed scale of field-of-view for anticipated travel along a low speed road that is more zoomed-in than a high-speed scale of field-of-view that is selected for anticipated travel along a high-speed road.

6. The article of manufacture of claim 4, wherein the program code instructions, when executed on the computer system, further cause the computer system to select the scale of field-of-view of the selected at least one image in response to the anticipated speed of the traveler on the computed route by selecting a first scale of view that includes a plurality of structures for anticipated travel along a high-speed interstate, and selecting a second scale of view that is more zoomed-in than the first scale of view for low speed road travel through a business district road.

7. A system, comprising:
an identifier that determines global positioning satellite coordinates of a geographic location of a navigation route point of a route computed for a traveler;
a retriever that searches a plurality of images within a pictorial image database for images that each have at least one attribute selected from a group of attributes of the geographic location comprising a first attribute of an embedded global positioning satellite coordinate tag that is within a threshold distance from the determined global positioning satellite coordinates, a second attribute of visually depicting a physical appearance of the location in a horizontal perspective and at a view angle correlated with an expected view of the traveler from the computed route and taken at a similar time of day as a current time of day, a third attribute of depicting an exterior business logo signage of a business at the location, and a fourth attribute of depicting a trade-dress architectural building exterior of the business at the location, and wherein the retriever further retrieves a plurality of the searched images that have at least one of the attributes selected from the group of attributes;
an analyzer that selects at least one of the plurality of retrieved images that is more relevant for association and use with the location than others of the plurality of retrieved images;
a presenter that presents the selected at least one image to the traveler in association with the geographic location navigation route point; and
a formatter that selects a scale of field-of-view of images in response to an anticipated speed of the traveler on the computed route, selects the at least one image by selecting images that have the selected scale of field-of-view; and formats and presents the selected at least one image at the selected scale of field-of-view.

8. The system of claim 7, wherein the formatter selects the scale of field-of-view of the selected at least one image in response to the anticipated speed of the traveler on the computed route by selecting a low-speed scale of field-of-view for anticipated travel along a low speed road that is more zoomed-in than a high-speed scale of field-of-view selected for anticipated travel along a high-speed road.

9. The system of claim 7, wherein the formatter selects the scale of field-of-view of the selected at least one image in response to the anticipated speed of the traveler on the computed route by selecting a first scale of view that includes a plurality of structures for anticipated travel along a high-speed interstate, and selecting a second scale of view that is more zoomed-in than the first scale of view for low speed road travel through a business district road.

10. The method of claim 1, wherein the step of retrieving the plurality of images further comprises retrieving images of amenities of the business at the location, wherein the images of amenities comprise at least one of an image of a restaurant interior, an image of a pool, and an image of a playground.

11. The method of claim 1, wherein the step of retrieving the plurality of images further comprises retrieving an image at the selected scale of field-of-view of a significant landmark near the location that may be spotted at the anticipated speed of the traveler in advance of an arrival by the traveler at the location.

12. The method of claim 11, wherein the significant landmark is a water tower, a distinctive building, a waterway, a body of water, a mountain, a bridge, a railroad track, a park, a resort, a stadium or an airport.

13. The article of manufacture of claim 4, wherein the program code instructions, when executed on the computer system, further cause the computer system to retrieve images in response to the images comprising an image at the selected scale of field-of-view of a significant landmark near the location that may be spotted at the anticipated speed of the traveler in advance of an arrival by the traveler at the location.

14. The article of manufacture of claim 13, wherein the significant landmark is a water tower, a distinctive building, a waterway, a body of water, a mountain, a bridge, a railroad track, a park, a resort, a stadium or an airport.

15. The system of claim 7, wherein the retriever retrieves images in response to the images comprising an image at the selected scale of field-of-view of a significant landmark near the location that may be spotted at the anticipated speed of the traveler in advance of an arrival by the traveler at the location.

16. The system of claim 15, wherein the significant landmark is a water tower, a distinctive building, a waterway, a body of water, a mountain, a bridge, a railroad track, a park, a resort, a stadium or an airport.

* * * * *